(12) United States Patent
Callister et al.

(10) Patent No.: US 9,363,136 B2
(45) Date of Patent: Jun. 7, 2016

(54) MECHANISM TO MONITOR QUALITY OF SERVICE

(71) Applicants: James Callister, Windsor, CO (US); Thomas A. Heynemann, Fort Collins, CO (US)

(72) Inventors: James Callister, Windsor, CO (US); Thomas A. Heynemann, Fort Collins, CO (US)

(73) Assignee: Intel Corporation, Santa Clara, CA (US)

(*) Notice: Subject to any disclaimer, the term of this patent is extended or adjusted under 35 U.S.C. 154(b) by 165 days.

(21) Appl. No.: 14/137,117

(22) Filed: Dec. 20, 2013

(65) Prior Publication Data

US 2015/0180703 A1 Jun. 25, 2015

(51) Int. Cl.
| | |
|---|---|
| G06F 11/00 | (2006.01) |
| H04L 12/24 | (2006.01) |
| G06F 11/30 | (2006.01) |
| G06F 11/34 | (2006.01) |
| H04L 12/26 | (2006.01) |

(52) U.S. Cl.
CPC ........ H04L 41/0627 (2013.01); G06F 11/3024 (2013.01); G06F 11/349 (2013.01); H04L 41/5009 (2013.01); H04L 43/16 (2013.01); H04L 41/0672 (2013.01)

(58) Field of Classification Search
CPC .............. G06F 11/0757; G06F 11/076; G06F 11/3024; G06F 11/3419; G06F 11/3423; G06F 11/349; H04L 41/0627
See application file for complete search history.

(56) References Cited

U.S. PATENT DOCUMENTS

| | | | | |
|---|---|---|---|---|
| 5,835,702 | A * | 11/1998 | Levine et al. | 714/39 |
| 6,112,318 | A * | 8/2000 | Jouppi et al. | 714/47.1 |
| 2003/0028701 | A1* | 2/2003 | Rao et al. | 710/305 |
| 2005/0283677 | A1* | 12/2005 | Adkisson et al. | 714/38 |
| 2007/0168807 | A1* | 7/2007 | Adkisson | 714/731 |
| 2012/0151263 | A1* | 6/2012 | Rentschler | G06F 11/22 714/30 |
| 2013/0142301 | A1* | 6/2013 | Frazier et al. | 377/33 |
| 2014/0337660 | A1* | 11/2014 | Hutchings et al. | 713/600 |

* cited by examiner

Primary Examiner — Marc Duncan
(74) Attorney, Agent, or Firm — Lowenstein Sandler LLP

(57) ABSTRACT

A processing device includes a processor to generate a plurality of events, an interface circuit coupled to the processor comprising one or more multiplexers to select events from the plurality of events, and a tracker logic coupled to the interface circuit to perform a quality of service (QoS) measurement based on the selected events.

19 Claims, 13 Drawing Sheets

MECHANISM TO MONITOR QUALITY OF SERVICE

TECHNICAL FIELD

The embodiments of the disclosure relate generally to a processing device including a logic circuit for monitoring quality of service (QoS), and, more specifically, relate to a processing device including a logic circuit that tracks measurable quantities between QoS events occurred in the processing device.

BACKGROUND

Quality of Service (QoS) may be determined by whether the performance of a service violates certain constraints. Examples of QoS measurements may include quantities measured between events occurred in a system. Proper measurement of QoS quantities may help post-silicon product development.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
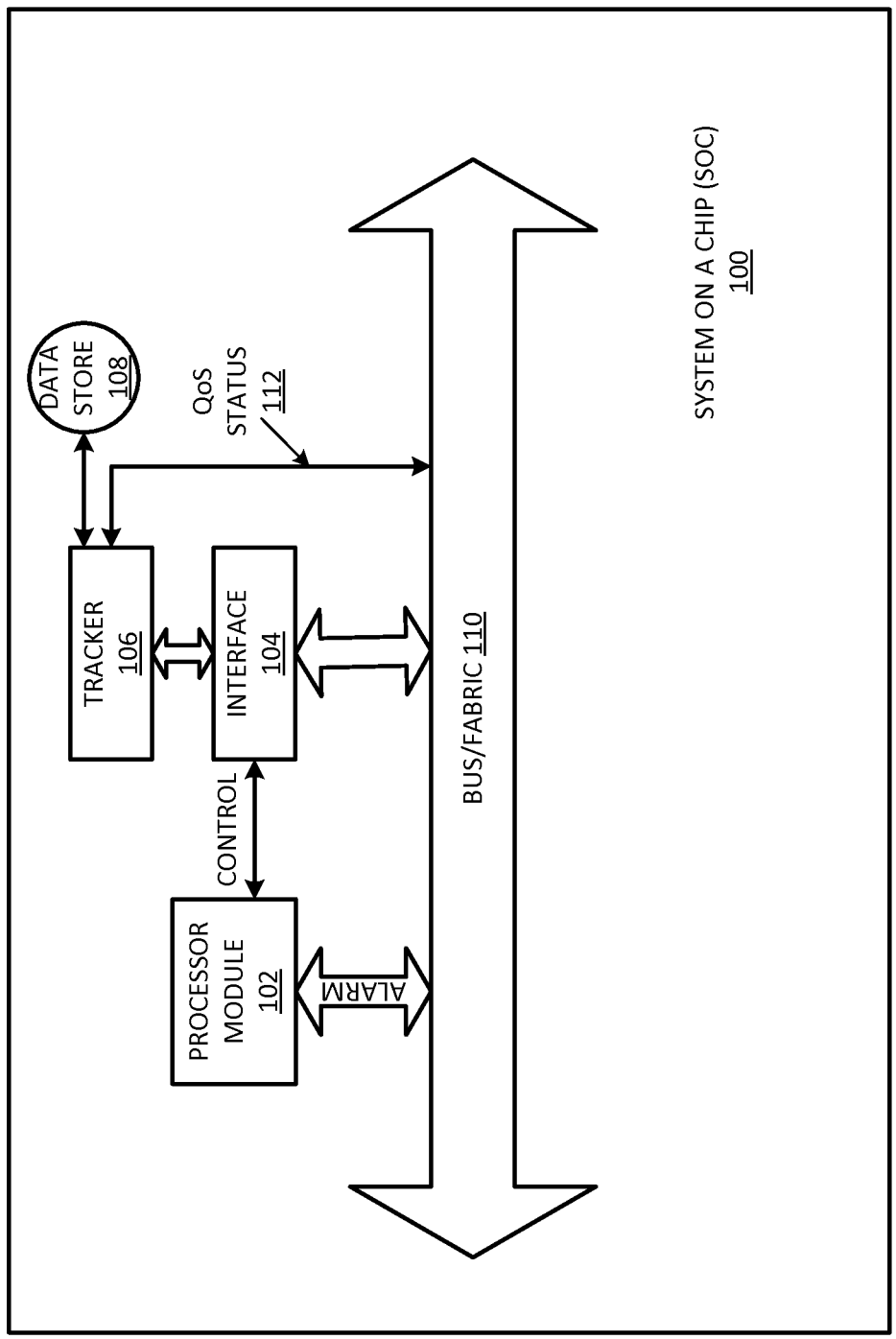
FIG. 1 illustrates a processing unit that includes an event tracker according to an embodiment of the present disclosure.

Embodiments of the present disclosure provide architectures that have the advantage of working collaboratively with different logic circuits to track the QoS performance of a system. In particular, the logic circuit may be embedded in components of the system as an integral part of these components to provide real-time QoS performance measurements. Further, the logic circuit may be programmable so that it may have the flexibility to measure QoS performance of different quantities.

Embodiments of the present disclosure may measure certain measurable quantities and compare the measured quantities against constraints. Embodiments of the present disclosure may also keep a record of the maximum values of the measured quantities. These maximum values may indicate how close the measured quantities are to the constraints.

Although the following embodiments may be described with reference to specific integrated circuits, such as in computing platforms or microprocessors, other embodiments are applicable to other types of integrated circuits and logic devices. Similar techniques and teachings of embodiments described herein may be applied to other types of circuits or semiconductor devices. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below.

Although the following embodiments are described with reference to a processor, other embodiments are applicable to other types of integrated circuits and logic devices. Similar techniques and teachings of embodiments of the disclosure can be applied to other types of circuits or semiconductor devices that can benefit from higher pipeline throughput and improved performance. The teachings of embodiments of the disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

The operation of a processing device may include the occurrences of a plurality of events. Events may include hardware events and software events. A hardware event may occur if a hardware component changes its operational state. For example, the start of writing to a memory device may be a hardware start event, and the end of the writing to the memory device may be a hardware end event. In another example, the receipt of audio packets from a network link may be a hardware start event, and the completion of the reception from the network link may be a hardware end event. Hardware events may raise an alert signal on bus and/or interconnect fabric to indicate the occurrences of the hardware events. The alert signals, while indicating the occurrence of a hardware event, do not suspend the operation of the processing device. For this reason, hardware events may be used to measure QoS.

Software events may occur by assigning marker instructions in executable code. These marker instructions may be embedded in the executable instruction stream and may be decoded at the instruction retirement stage to generate a software event. In an embodiment, the software event may activate or deactivate one or more alarm signals on bus and/or interconnect fabric to indicate the occurrences of the software event. In this way, the occurrences of software events may be mapped in the processing device as hardware events so that software events may be handled as hardware events.

An operation may have a start (referred to as start event) and an end (referred to as an end event). Quantities measured between a start event and an end event may be used as the measurements of quality of services. In an embodiment, the time interval between the start and end events (also referred to as interval of interest) may be used as a QoS quantity to be compared with a time constraint (also referred to as a deadline). In another embodiment, a total number of tries between the two events may be used as a QoS quantity to be compared to a number-of-trial constraint. Thus, measurable quantities demarcated by events may be tracked to provide QoS indicators and measurements.

Embodiments of the present disclosure may include a circuit logic (referred to as tracker or QoS event tracker) as an integral part of a processing device to measure QoS quantities. The measured quantities may be compared to constraints stored in a register. The constraints may be specified by program instructions of a user. Based on the comparison, the tracker may generate different QoS signals that may be used to quantify hardware and software performance. Embodiments of the disclosure are compact circuits, and therefore may be implemented as an integral part of a wide range of processing units without incurring significant increase of cost and power consumption. Embodiments of the disclosure are programmable circuit logics, and therefore may be used to monitor different types of QoS quantities on the same circuit logics. The tracker may track both hardware-defined and software-defined events, and is also extensible to track multiple processing units. The tracker may be shared by a plurality of applications running on a same processor and managed by an operating system (OS) or a virtual machine as a shared resource. Embodiments of the disclosure may also be used to detect and locate denial of service attacks that may be disguised as QoS constraint violations.

FIG. 1 illustrates a processing unit that includes an event tracker according to an embodiment of the present disclosure. In an embodiment, the processing unit may be a system-on-a-chip hardware circuit block 100 that may be implemented on a single die (a same substrate) and within a single semiconductor package. The processing unit may be a central processing unit (CPU) or a graphic processing unit (GPU). Referring to FIG. 1, the processing unit may include a processor module 102, an interface circuit 104, a tracker logic 106, a data store 108, a bus/interconnect fabric 110, and signal link 112. Processor module 102 and interface circuit 104 may be respectively coupled to bus/interconnect fabric 110. A tracker logic 106 may be coupled to interface 104. Outputs from tracker logic 106 may be transmitted to data store 108 and/or through a link 112, indicating QoS status, back to bus/interconnect fabric 110. Additionally, processor module 102 may provide control signals to interface 104 through which the processor module 102 may selectively control the access to tracker logic 106.

In operation, processor module 102 may execute a stream of instructions that may be embedded with marker instructions for initiations and conclusions of software events. The execution of a segment of instructions may constitute a software event. For example, the execution of instructions that decode data packets received from network may be a software event. The marker instructions may also trigger hardware alarm signals that may be placed on bus/interconnect fabric 110. Additionally, processor module 102 may also incur hardware events such as memory operations and communication network operations. These hardware events may also place alarm signals on bus/interconnect fabric 110. Interface 104 may listen to bus/fabric 110 to receive the alarm signals. Interface 104 may include a plurality of multiplexers and counters (not shown), where the multiplexers may be controlled by the control signal from processor module 102 to selectively assign alarm signals from bus/fabric 110 to an appropriate counter. Tracker logic 106 may be coupled to these counters and track quantities stored in different counters. In an embodiment, the tracked quantities may be compared to constraint values that may be specified by programs at user's instruction. Based on the comparison, QoS status may be generated and provided to bus/fabric 110 through link 112. QoS status may include indicators that 1) a constraint is violated; 2) events have completed; 3) events are not finished. In an embodiment, for the scenario that events have completed, tracker logic 106 may store a maximum value for the tracked quantity at data store 108. This is helpful when the maximum value for the tracked quantity is smaller than the specified constraint because the maximum value may indicate how close the tracked quantity is to the specified constraint. Thus, the QoS status from tracker logic 106 and the maximum value stored in data store 108 may be used to provide QoS measurements.

Figure 2:
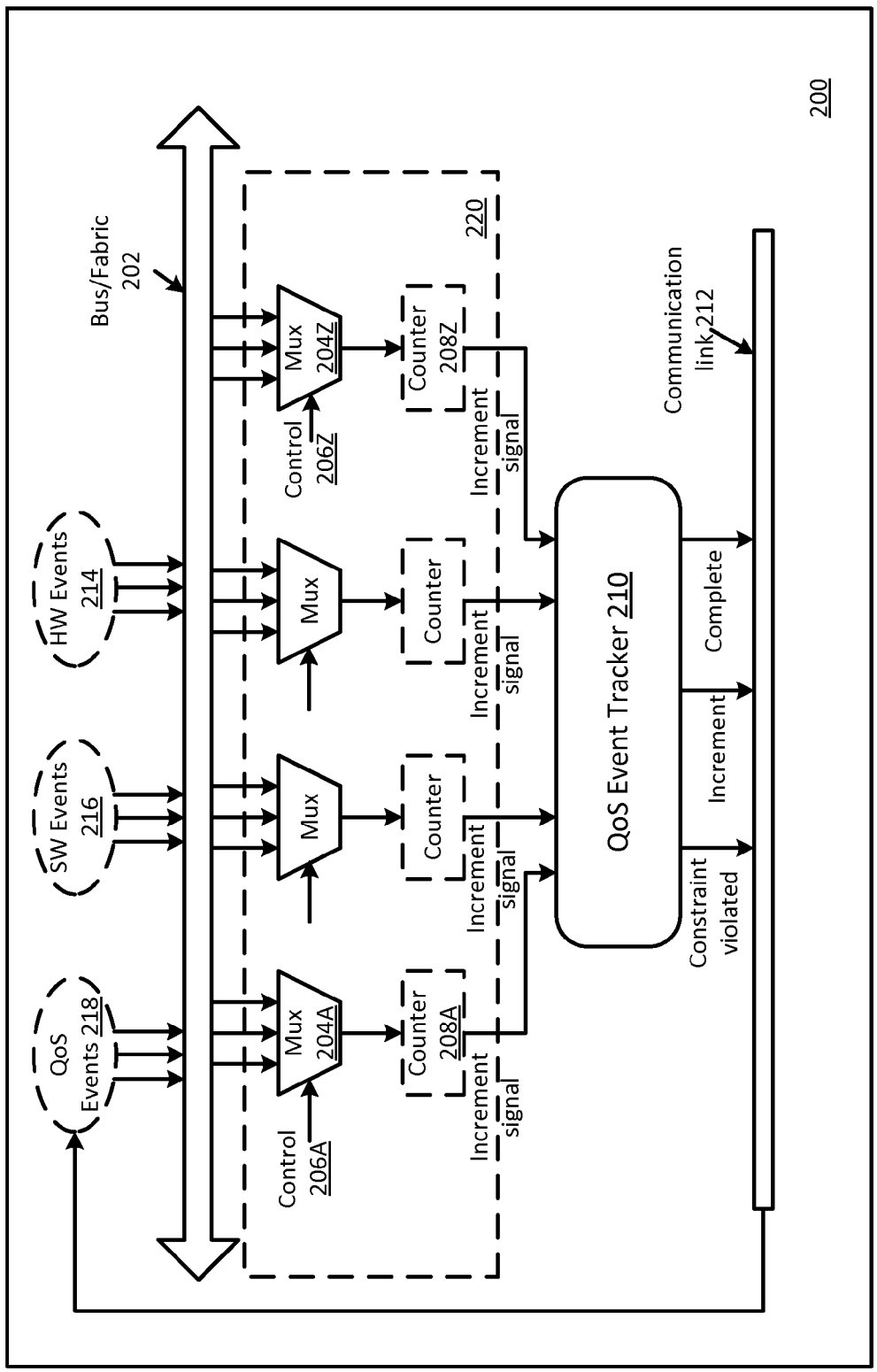
FIG. 2 is a detailed illustration of an interface that works collaboratively with a QoS event tracker according to an embodiment of the disclosure.

FIG. 2 is a detailed illustration of an interface 220 that may work collaboratively with a QoS event tracker 210 according to an embodiment of the disclosure. Components of the interface 220 and QoS event tracker 210 may be part of an integrated circuit block 200. Components of the interface 220 may include a plurality of multiplexers 204A-204Z, and may optionally further include a plurality of counters 208A-208Z (shown in dashed lines). Each of multiplexers 204A-204Z may receive control signals 206A-206Z and selectively output increment signals with respect to an event that starts a QoS measurement. Outputs of multiplexers 204A-204Z may be coupled directly to inputs of QoS event tracker 210, or alternatively, to a respective counter 208A-208Z and then to inputs of QoS event tracker 210. The QoS event tracker 210 may track and analyze the increment signals at its inputs and generate QoS status of "constraint violated," "increment," and "complete." These QoS status may be placed on a communication link 212 as QoS events 218. QoS events 218 like hardware events 214 and software events 216 may generate alarms that are routed to bus/interconnect fabric 202.

As shown in FIG. 2, hardware events 214, software events 216, and QoS events 218 may trigger alarm signals that may be transmitted on to bus/interconnect fabric 202. QoS events 218 may be a start event, an end event, or a reset (or abort) event. Multiplexers 204A-204Z may include inputs that are coupled to bus/interconnect fabric 202 to monitor alarm signals thereon. In an embodiment, an alarm signal may raise a particular alarm wire coupled to bus/interconnect fabric 202. Thus, the number of events that may be specified is based on the number of alarm wires. Different inputs of multiplexers 204A-204Z may be coupled to different alarm wires to monitor occurrences of different events. In one embodiment, the outputs from multiplexers 204A-204Z indicating increment signals may be directly coupled to inputs of QoS event tracker 210.

In an alternative embodiment, each counter 208A-208Z may be assigned to count a measurement of a particular event. In this regard, control signals 206A-206Z generated from a processor module may control multiplexers 204A-204Z to selectively route their inputs to their outputs. The outputs of multiplexers 204A-204Z may cause a count increment at corresponding counters 208A-208Z. For example, if counter 208A is assigned to a hardware event (e.g., operations on a memory device), control 206A may select the alarm wire corresponding to the event to the output of multiplexer 204A. Thus, a measurement increase of this particular event may cause increments in counter 208A. QoS event tracker 210 may be coupled to outputs of counters 208A-208Z which may each include number of count increment of a respective event since it starts. The number of increments stored in counters 208A-208Z may be one or more than one.

QoS event tracker 210 may count QoS quantities demarcated by between start and end events. In an embodiment, an event may be selected to start counting a QoS quantity, and one or more events may be selected to end the counting. The accumulated count between the start event and the end event may constitute an accumulated count of the QoS quantity. In addition to a natural ending of the counting, certain events may abort the counting before its natural ending. QoS event tracker 210 may also include a memory device (not shown) for storing at least one constraint value. Tracker 210 may compare the accumulated count against the constraint value. In an embodiment, QoS event tracker 210 may include three outputs of "constraint violated," "increment," and "complete." Each of the three outputs may be indicated by a binary indicator on the output lines of QoS event tracker 210 to indicate whether an output status has occurred. If the accumulated count as a QoS measurement equals to or exceeds the constraint value, the "constraint violated" output line may be triggered to a state indicating this violation of QoS. If the counting of QoS quantity is completed because of an ending event rather than an aborting event, the "complete" output may indicate a completion state. On the other hand, if the counting of QoS quantity is ended by an abort event, the "complete" output may indicate an incomplete state. QoS event tracker 210 may also include an internal counter that may be selectively increased. The "increment" output may indicate an increment every time the internal counter increases. These outputs may be treated as hardware/software events and fed back to bus/fabric 202.

In an embodiment, the QoS quantity may be a time interval eclipsed since the occurrence of a starting event. The performance of an operation may be constrained by a deadline. A user may want to know how much time spent on an operation prior to its ending and whether the time spent exceed a deadline. This information may help diagnose performance bottleneck. Thus, the outputs may be an interval increment, interval complete, and deadline violation.

In another embodiment, the QoS quantity may be a number-of-tries count since the occurrence of a starting event. For example, since the start event, tracker 210 may count how many times an outsider tries to gain, without success to access, to the device. The count of failed tries may be compared to a constraint number. If the count exceeds the constraint number, output may indicate the constraint violation which may be used to protect a device from denial of service attempts.

Figure 3A:
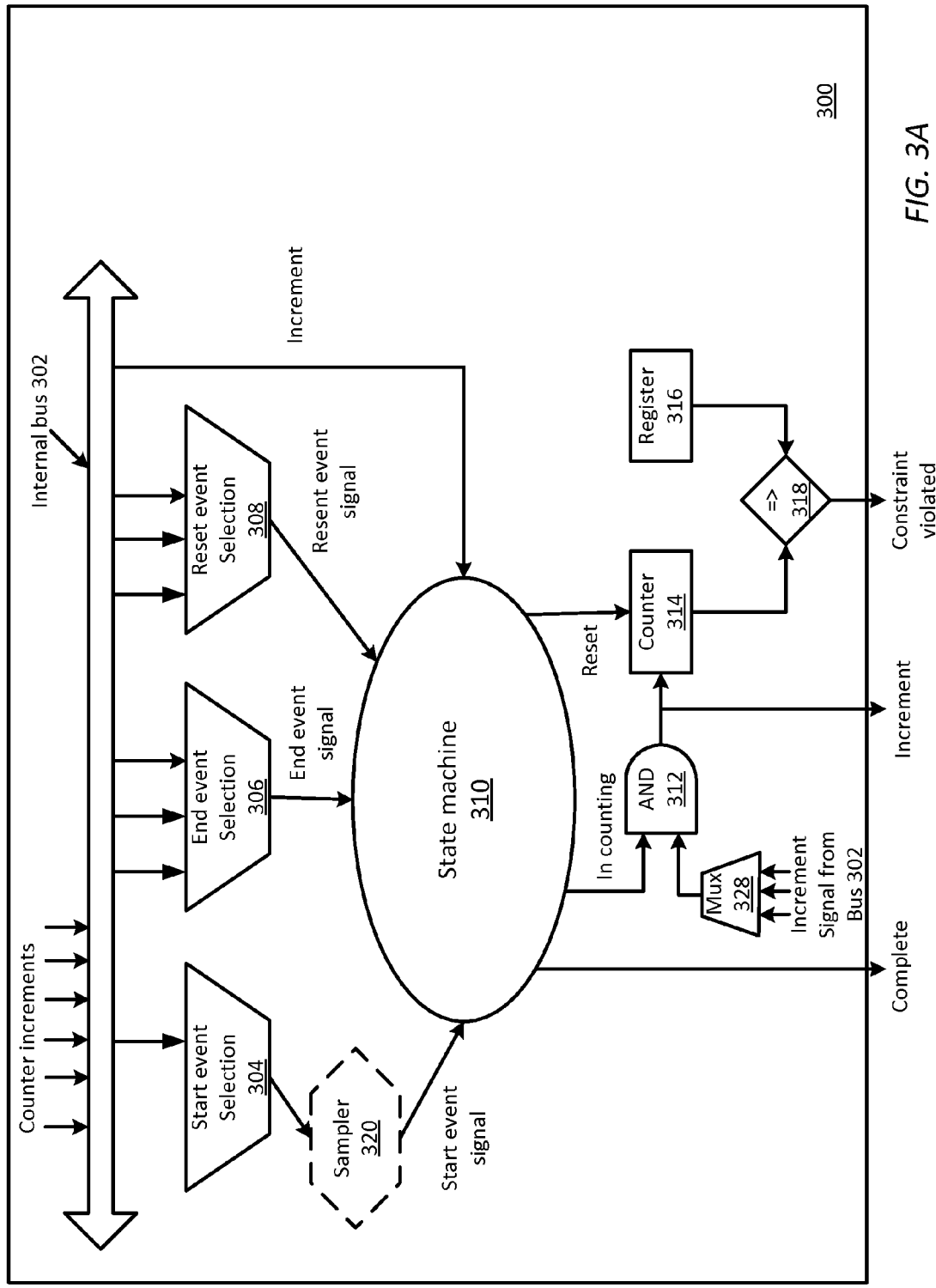
FIG. 3A illustrates a QoS event tracker according to an embodiment of the disclosure.

QoS event trackers may be implemented in many ways. FIG. 3A illustrates a QoS event tracker 300 according to an embodiment. QoS event tracker 300 may include an internal bus 302, a start event selection multiplexer 304, an end event selection multiplexer 306, a reset event selection multiplexer 308, a state machine 310, an AND logic 312, an internal counter 314, a register 316, a comparator 318, and a multiplexer 328. QoS event tracker 300 may further optionally include a sampler 320 (shown in dashed lines). Internal bus 302 on one side may receive the counter increment signals (directly from multiplexers 204A-204Z or from counters 208A-208Z as shown in FIG. 2) and transmit the increment signals to inputs of multiplexer 328. Bus 302 may also receive event signals including start event signals, end event signals, and reset event signals and transmit these event signals to inputs of start event selection multiplexer 304, end event selection multiplexer 306, and reset event selection multiplexer 308. In an embodiment, an output of start event selection multiplexer 304 may be directly coupled to state machine 310. In an alternatively embodiment, the output of the start event selection multiplexer 306 may be coupled to the state machine 310 through a sampler 320. Outputs of end event selection multiplexer 304 and reset event selection multiplexer 306 may be coupled to state machine 310. State machine 310 may include a first output representing the "complete" status for QoS event tracker 300, a second output coupled to a first input of an AND logic 312, and a third output coupled to a reset pin of internal counter 314. The AND logic 312 may include a second input for receiving increment signals selected by multiplexer 328. An output of the AND logic 312 may be coupled to an input of internal counter 314 and simultaneously, provide the "increment" status output for the QoS event tracker 300. Comparator 318 may compare the output from internal counter 314 with an output from register 316 to generate the "constraint violated" status for QoS event tracker 300.

Start event selection multiplexer 304 may select a single counter event as the start event for the beginning of a QoS count for that event. In one embodiment, the start event selection multiplexer 304 may transmit every start event directly to state machine 310. In an alternatively embodiment, the start event selection multiplexer 304 may transmit every start event to sampler 320, and through sampler 320, to state machine 310. Sampler 320 may be programmed to randomly select one out of a number of start events to pass to state machine 310. This may be useful if multiple start events begin closely enough that the state machine 320 is not capable of counting multiple QoS quantities concurrently. In one embodiment, sampler 320 may be implemented with a linear feedback shift register (LFSR).

End event selection multiplexer 306 may select one or more counter events received from internal bus 302 as end events and transmit end event signals to state machine 310. Similarly, reset event selection multiplexer 308 may select one or more counter events received from internal bus 302 as reset events and transmit reset event signals to state machine 310. In an embodiment, the reset events may be used to abort QoS counting by state machine 310. Thus, embodiments of the disclosure may handle a single start event that has multiple exits, i.e., end events and/or reset events.

State machine 310 at inputs may receive start, end, and reset signals, and based on these signals, determine when to start, end, and abort a QoS counting. If an end event signal follows a start event signal without intervening reset event signal, state machine 310 may output a "complete" status at the first output of QoS event tracker 300. However, if a reset event signal follows the start event signal without an intervening end event signal, state machine 310 may transmit a reset signal to internal counter 314. The reset signal may reset counter 314 to zero. In an embodiment, state machine 310 may recognize end event signals and/or reset event signals after a start event signal initiates a QoS counting process.

Once a QoS counting processing starts in response to the detection of a start event, state machine 310 may cause the "in counting" to go high and remain high until a reset or end event is recognized. A second input of AND logic 312 may receive a selected increment signal that is selected based on the QoS measurement being performed. In an embodiment, the increment may be a real-world clock, and AND logic 312 may output a pulse for every clock cycle while state machine 310 is in the process of QoS counting. In another embodiment, the reference may be a number-of-tries increment so that output of AND logic 312 indicates an increment in failed tries.

The output from AND logic 312 may further trigger an increment at internal counter 314 and concurrently, output an "increment" status for the increment output of the QoS event tracker 300. Register 316 may store data written in response to instructions provided by a user. The data stored in register 316 may be constraint values for the QoS count. The data stored in register 316 may have the same real-world unit as the reference. In an embodiment, the constraint stored in register 316 may be a deadline constraint indicating an upper limit for hardware/software events. In another embodiment, the constraint stored in register 316 may be an upper limit. Comparator 318 may compare data stored in counter 314 with that stored in register 316. If data stored in counter 314 is less than that stored in register 316, the output of comparator (same as QoS event tracker 300) exhibits no "constraint violation." However, if data stored in counter 314 is increased to a level that equals to the constraint stored in register 316, the output of comparator exhibits "constraint violated."

In an embodiment, an end event signal may also be used as a start event signal for a subsequent QoS counting process. Thus, an end event for one occurrence may start another occurrence of QoS process consecutively.

In an embodiment, a reset event signal may cause state machine 310 to issue a reset to counter 314 and reset it to zero. Concurrently, state machine 310 may output an "incomplete" status at the first output.

Figure 3B:
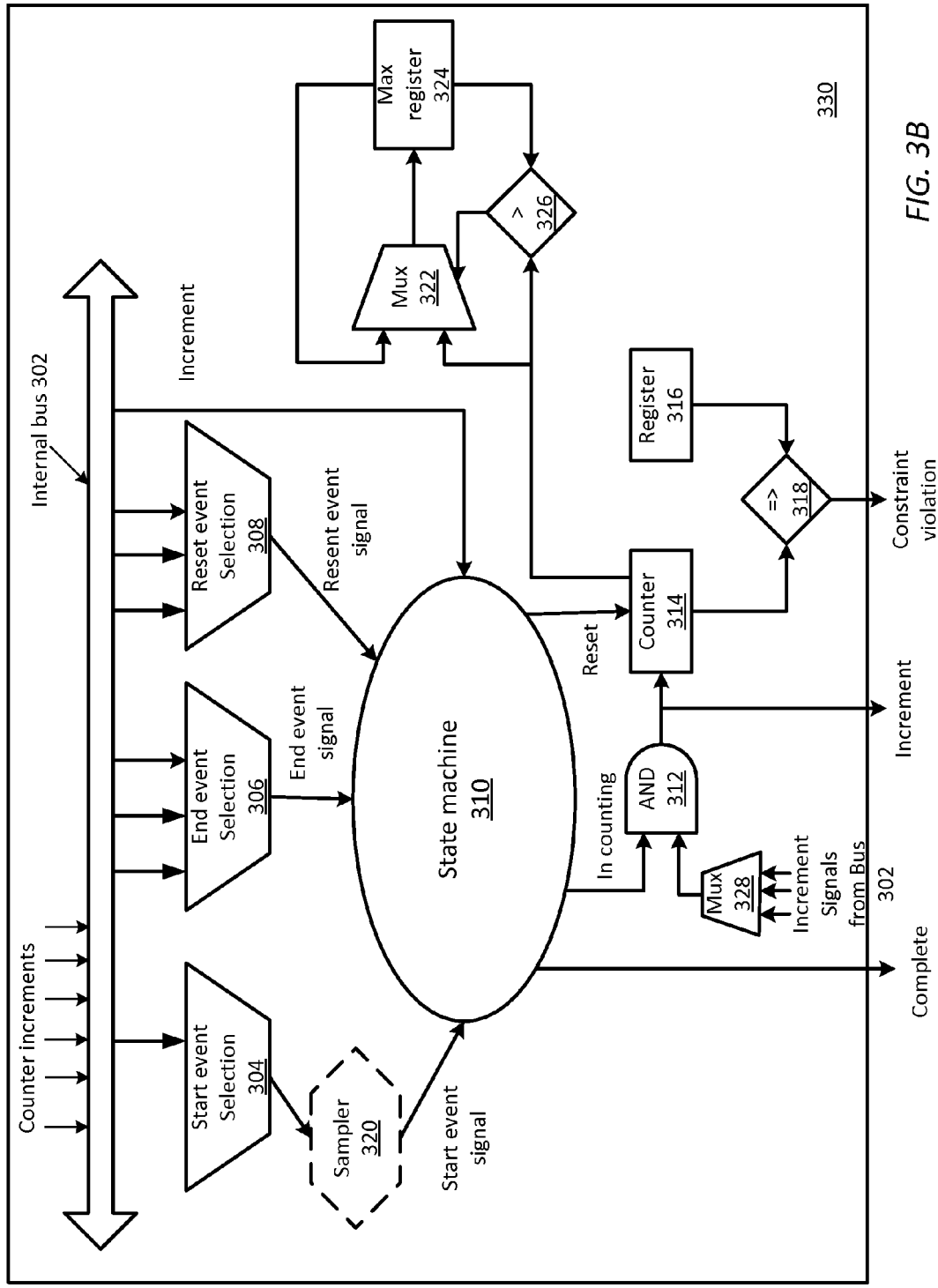
FIG. 3B illustrates a QoS event tracker according to another embodiment of the disclosure.

QoS event tracker 300 as shown in FIG. 3A may detect constraint violations as QoS events. However, under certain situations, it is desirable to know how close the accumulated QoS counts stored in counter 314 are to the constraints even if the data stored in counter 314 do not violate the constraint. FIG. 3B illustrates a QoS event tracker 330 that stores a maximum QoS value according to an embodiment of the disclosure. QoS event tracker 330 may include same components as the QoS event tracker 300 as shown in FIG. 3A. Additionally, QoS event tracker 330 may further include a multiplexer 322, a maximum value register 324, and a second comparator 326.

Maximum value register 324 may store a maximum value that counter 314 has ever recorded. Maximum value register 324 may be initialized with a zero value. Data stored in counter 314 may be provided to a first input of comparator 326 and to a first input of multiplexer 322. A second input of comparator 326 and a second input multiplexer 322 both may receive the maximum value stored in register 324. Comparator 326 may compare data stored in counter 314 with the maximum value stored in register 324. If data in counter 314 is larger than the maximum value stored in register 324, comparator 326 may output a control signal to multiplexer 322 to select the first input as the output of the multiplexer 322 to write the data stored in counter 314 to register 324. However, if data in counter 314 is less or equal to the maximum value, comparator 326 may output a control signal to multiplexer 322 to select the second input as the output of the multiplexer 322 so that the maximum value stored in register 324 is maintained. In this way, a maximum QoS count may be stored in register 324. In an embodiment, register 324 may be read by a read instruction from a program. The maximum value stored in register 324 may be used to measure a QoS quantity.

Figure 4:
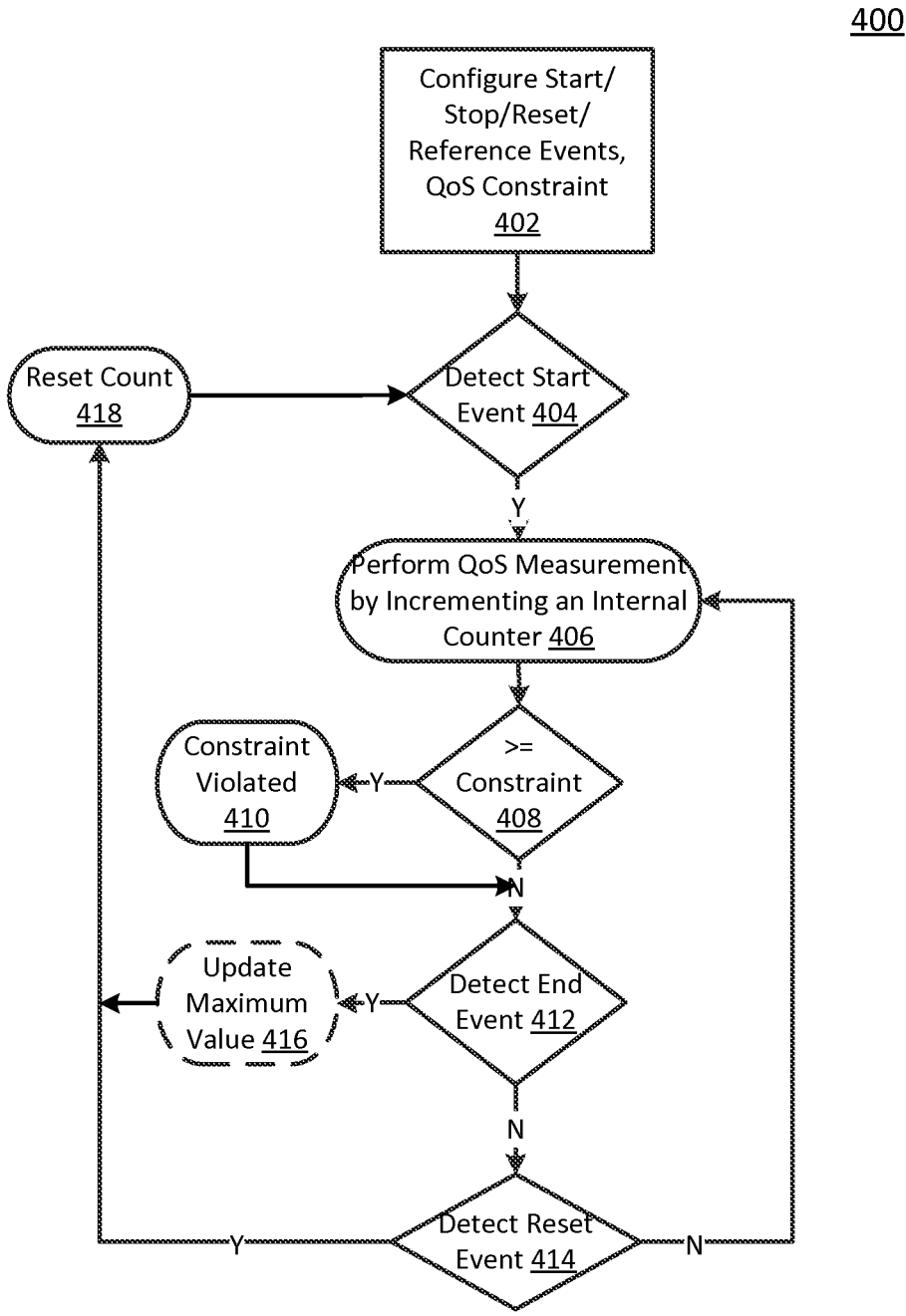
FIG. 4 is a flow diagram of a method for operating a QoS event tracker according to an embodiment of the disclosure.

FIG. 4 is a flow diagram of a method for operating a QoS event tracker according to an embodiment of the disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of any one of the event tracker logic 106, and QoS event trackers 210, 300, 330 described above with respect to FIGS. 1, 2, and 3A-3B.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, the processing logic may receive a counter increment signal for an event from an interface circuit listening to an interconnect fabric on which hardware events and software events place alarm signals. At 402, in response to instructions by a user, the processing logic may be programmed to instruct multiplexers (304, 306, 308, 328) in processing logic to select inputs for specific events. Further, register 316 may be programmed with corresponding constraint value for a select event. Internal bus (302) of the processing logic may receive a number of events and increment signals. At 404, the processing logic may detect if there is a start event. When there is no start event, the processing logic may wait. When the processing logic detects a start event, it may start to perform a QoS measurement at 406. The QoS measurement may be achieved through a state machine (310) and an AND logic (312) as shown in FIGS. 3A-3B. The state machine may maintain an "in counting" signal from a start event until an end event or reset event. An output of the AND logic may cause an increment at the internal counter at each increment signal while the "in counting" is ON (or high). At 408, the processing logic may compare the value stored in the internal register with the stored constraint. If the value stored in the internal counter is greater than or equals to the constraint, at 410, the processing logic may provide an output indicating that the constraint is violated ("Constraint Violated") and then go back to counting. However, if the value is less than the constraint, at 412, processing logic may detect if there is an end event. If there is no end event, at 414, the processing logic may detect if there is a reset event. If there is no reset event, the processing logic may go back to operation 406 to continue performing QoS measurement. However, at 412, if the processing logic detects an end event corresponding to the start event, the QoS measurement may be ended. In this scenario, the value stored in the internal counter may indicate the maximum value that has been accumulated. At 416, the processing logic may optionally update the maximum value stored in a maximum value register (324) as shown in FIG. 3B. At 414, if the processing logic detects a reset event, it may reset the internal counter at 418 and then restart 404.

Embodiments of the disclosure may be used in computing devices and mobile devices to monitor both hardware and software stacks so that they meet QoS requirements. Embodiments of the disclosure may also be used in post-silicon quality control for quick identification and location of potential QoS problems.

Embodiments of the disclosure may help shorten time-to-market by finding and fixing QoS problems relating to hardware and software. Embodiments also provide QoS characterizations to end users. They also provide original equipment manufacturers (OEM's) with valuable tools to validate their software stacks on hardware containing QoS event trackers, and the ability to dynamically modify their equipment configurations to avoid QoS issues.

Figure 5:
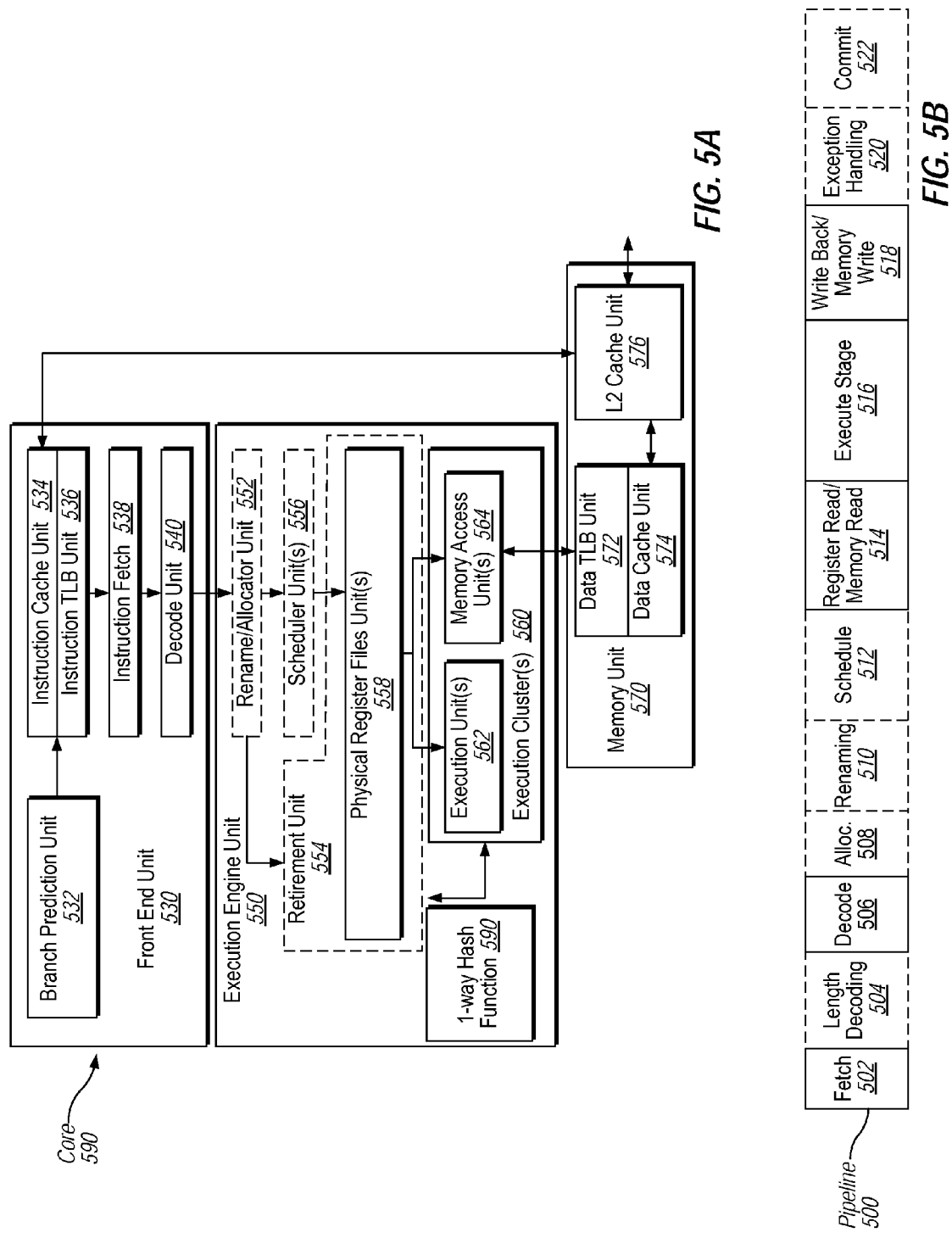
FIG. 5A is a block diagram illustrating a micro-architecture for a processor in which one embodiment of the disclosure may be used.
FIG. 5B is a block diagram illustrating an in-order pipeline and a register renaming stage, out-of-order issue/execution pipeline implemented according to at least one embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
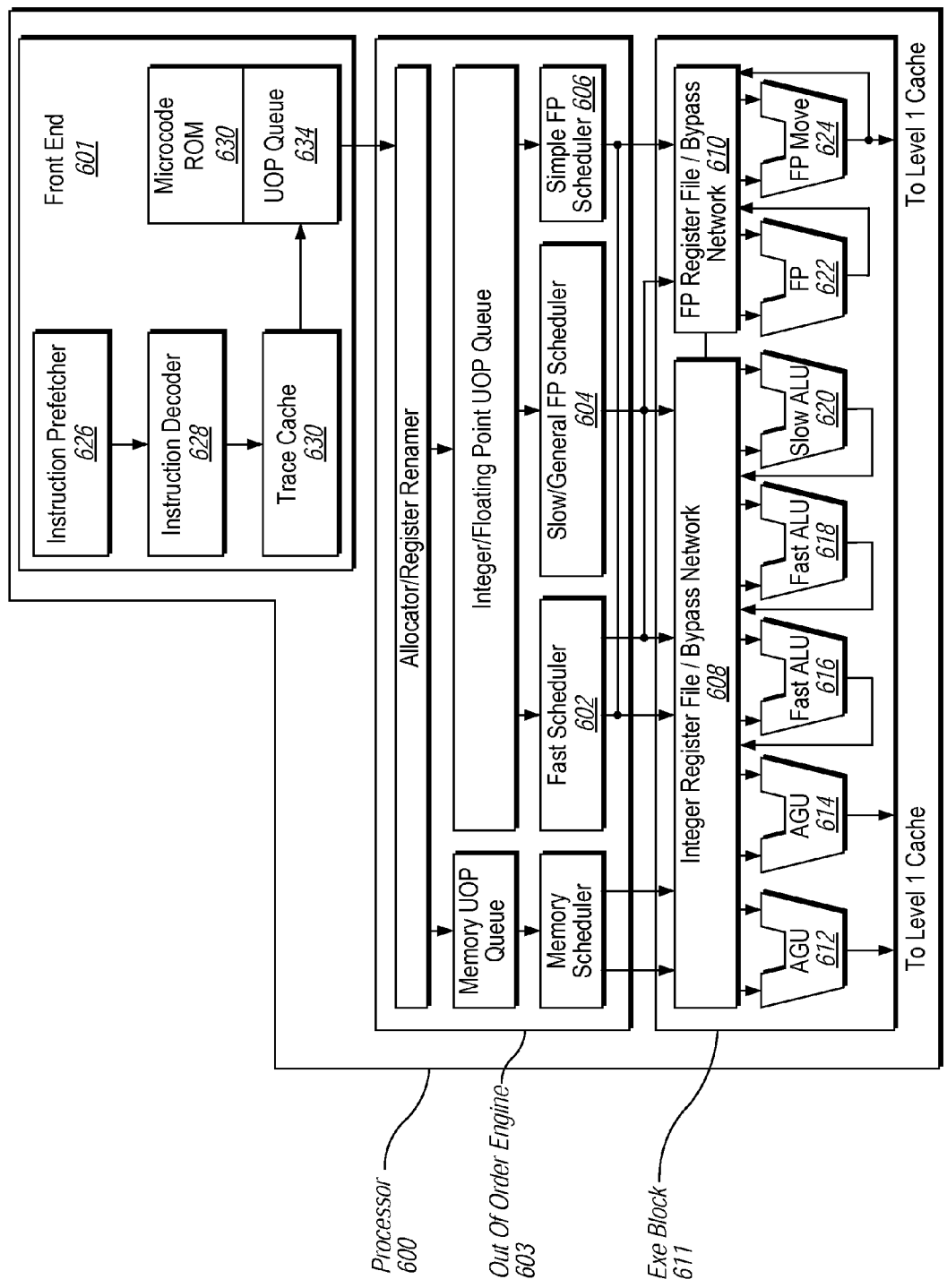
FIG. 6 illustrates a block diagram of the micro-architecture for a processor in accordance with one embodiment of the disclosure.

FIG. 6 illustrates a block diagram of the micro-architecture for a processor 600 in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
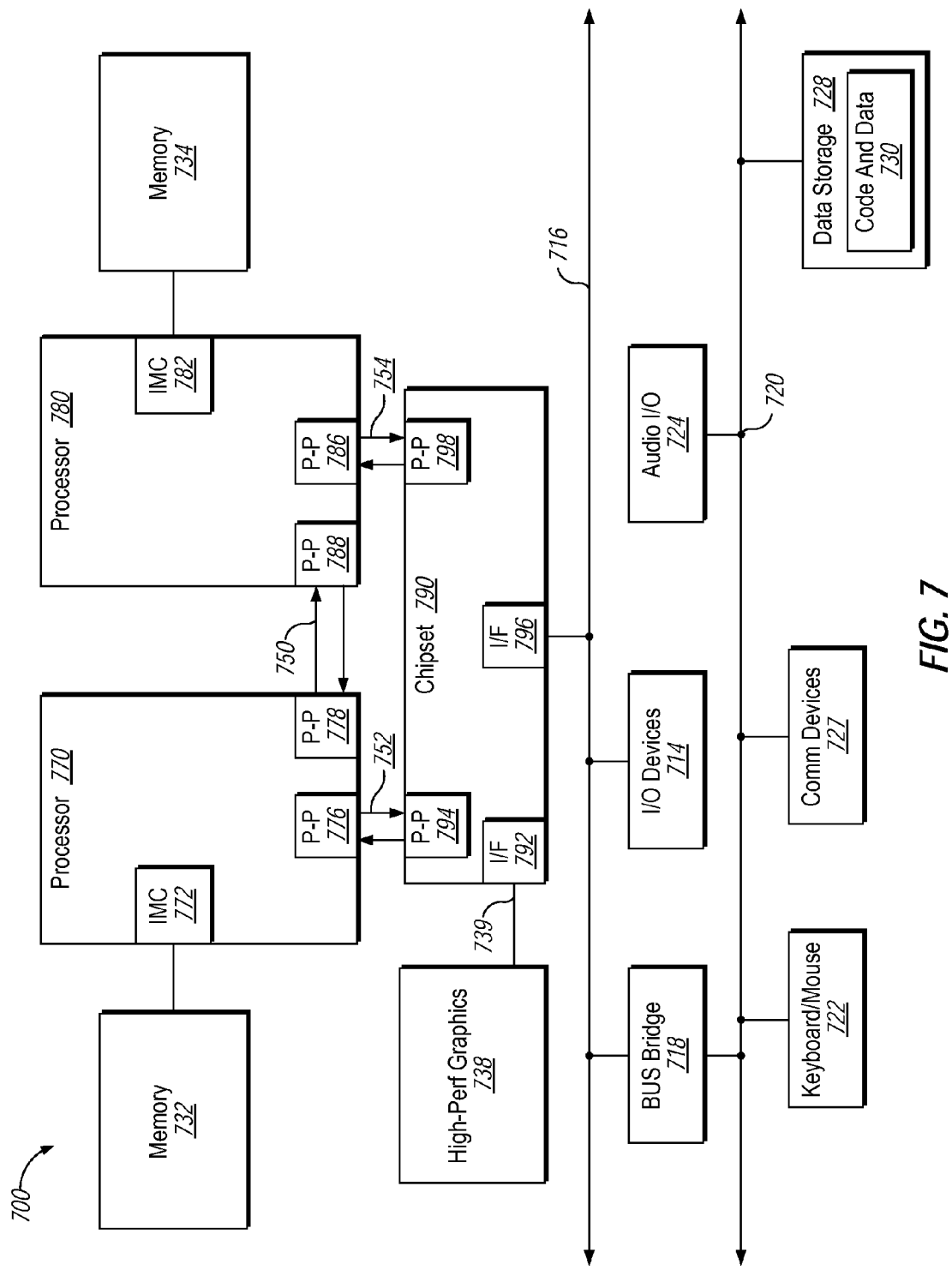
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that embodiments of the disclosure are not so limited. In other embodiments, one or more additional processors may be present in a given processor.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
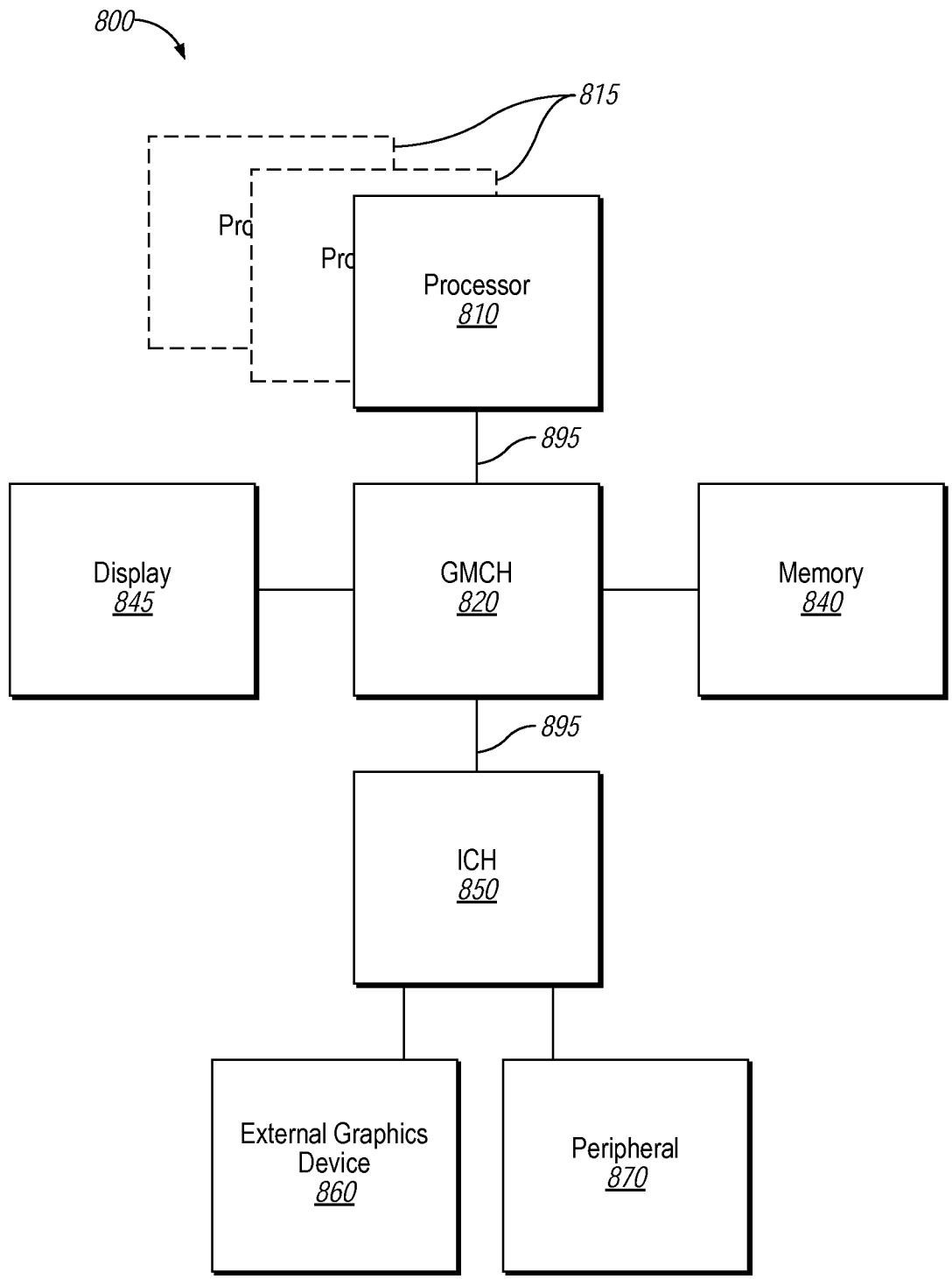
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
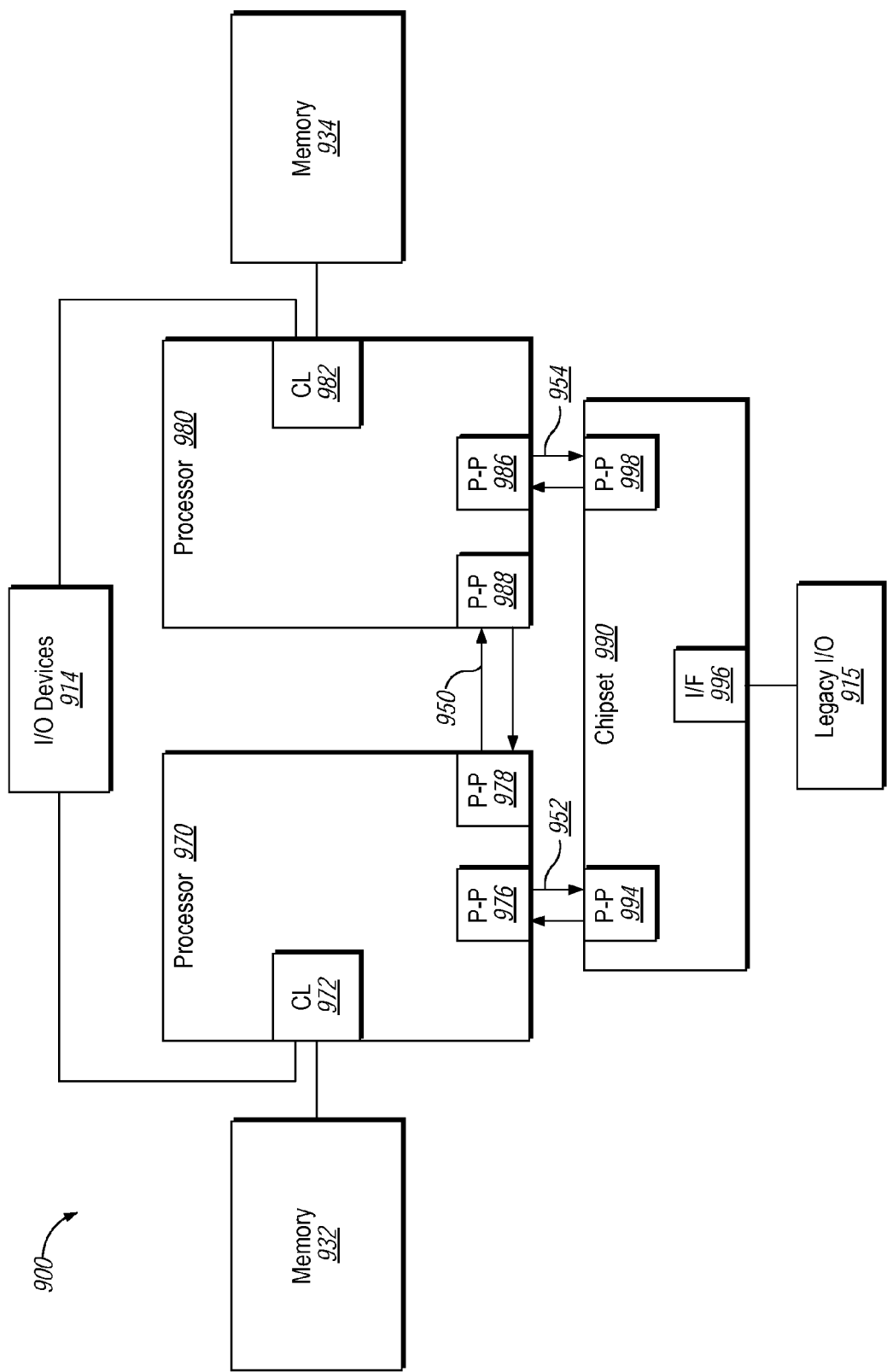
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
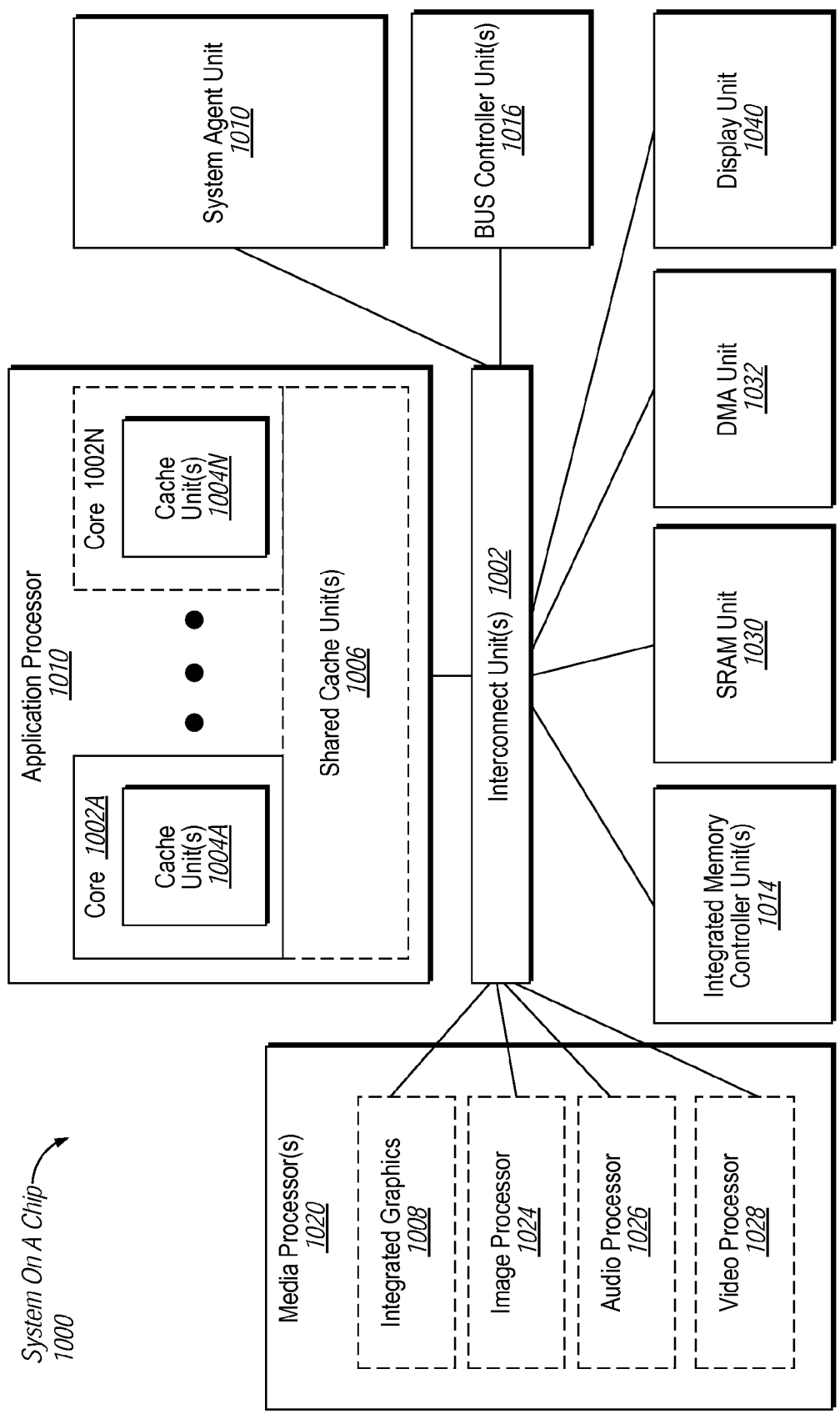
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
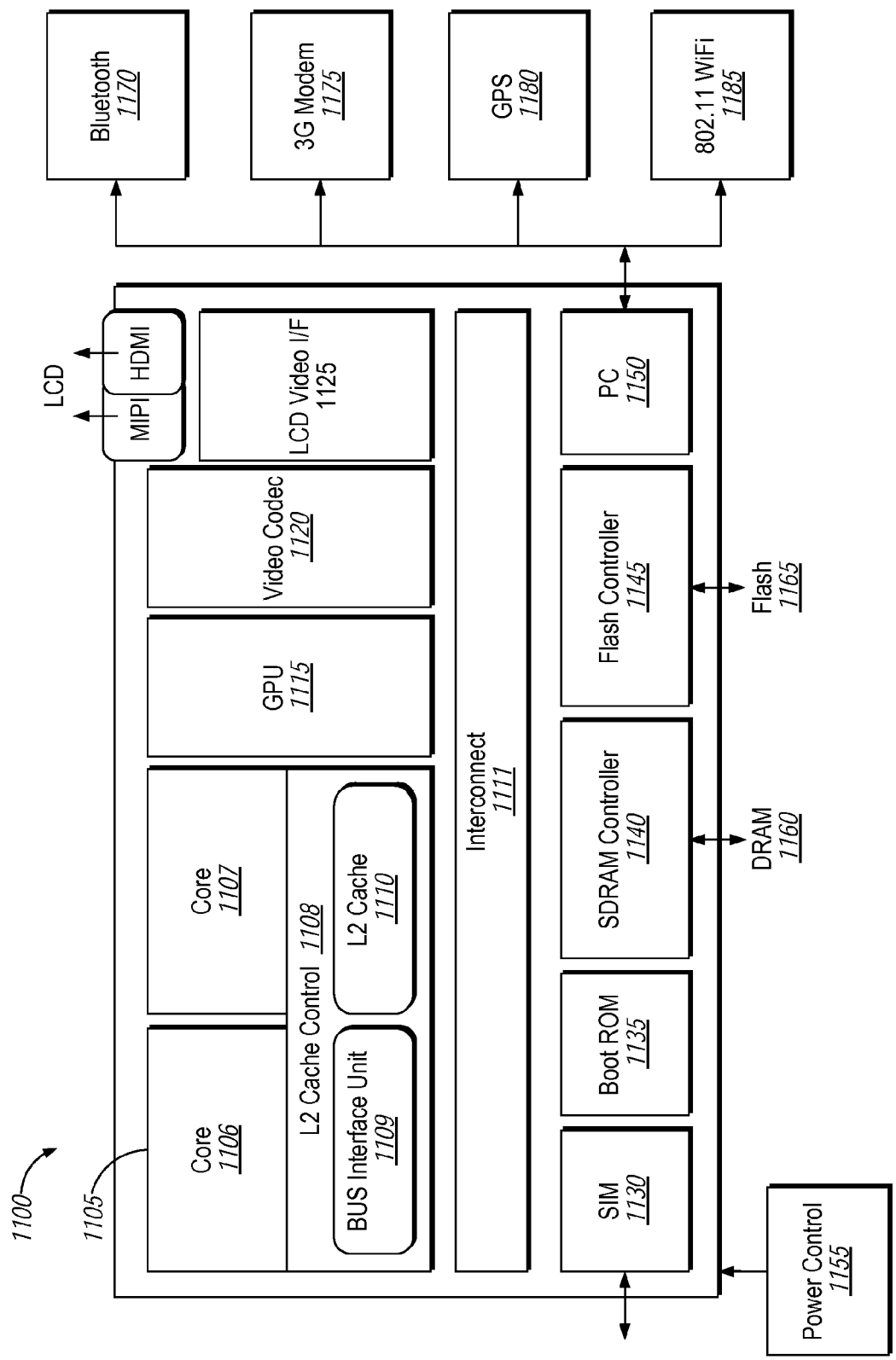
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
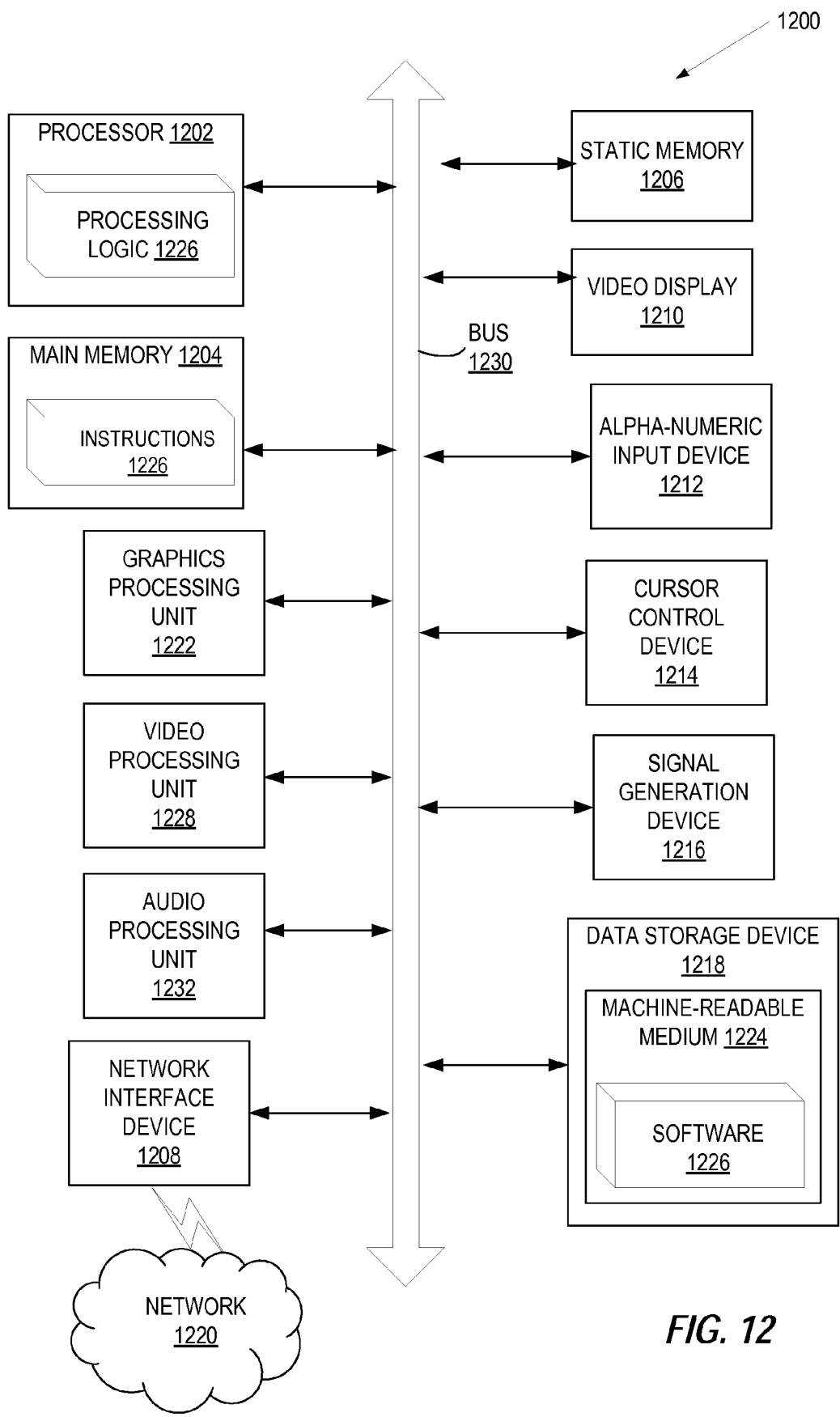
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction and/or a software library containing methods that call the above applications. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing device that may include a processor to generate a number of events, an interface circuit coupled to the processor, the interface comprising one or more multiplexers to select events from the plurality of events, and a tracker logic coupled to the interface circuit to perform a quality of service (QoS) measurement based on the selected events.

In Example 2, the subject matter of Example 1 can optionally include an interconnect fabric coupled between the interface and the processor.

In Example 3, the subject matter of any of Examples 1 and 2 can optionally provide that the events include at least one of a hardware event or a software event that triggers an alarm signal being transmitted to the interconnect fabric.

In Example 4, the subject matter of any of Examples 1 and 2 can optionally provide that the events include start events and end events.

In Example 5, the subject matter of Example 4 can optionally provide that the QoS measurement is one of (a) a time interval between a start event and an end event, or (b) a number of failed trials between a start event and an end event.

In Example 6, the subject matter of claim 5 can optionally provide that the tracker logic is further to compare the QoS measurement to a constraint to determine if there is a constraint violation.

In Example 7, the subject matter of claim 6 can optionally provide that the tracker logic further includes a first multiplexer converting a start event into a start event signal, a second multiplexer converting an end event into an end event signal, a state machine receiving the start event signal and the end event signal to generate an in-counting signal from occurrence of the start event signal to occurrence of the end event signal, a second counter for storing an accumulated count of the QoS measurement, a register for storing the constraint, a third multiplexer to select an increment signal, and an AND logic to provide an increment to the internal counter based on the selected increment signal and the in-counting signal.

In Example 8, the subject matter of Example 7 can optionally provide that in response to receiving the end event signal after the start event signal, the tracker logic is to output a complete status in a first output of the tracker logic, in response to receiving an increment signal, the tracker logic is to output a new increment signal in a second output if the in-counting signal is enabled, and in response to a comparison between the accumulated count and the constraint indicating that the accumulated count is greater than or equals to the constraint, the tracker logic is to output a constraint violation status in a third output of the tracker logic.

In Example 9, the subject matter of Example 8 can optionally provide that the tracker logic further comprises a maximum value register for storing a maximum value ever stored in the counter.

Example 10 is a system-in-a-chip (SoC) that may include an interface circuit comprising an interface circuit comprising one or more multiplexers to select events from the plurality of events generated by a processor, and a tracker logic, coupled to the interface circuit, to perform a quality of service (QoS) measurement based on the selected events.

In Example 11, the subject matter of Example 10 can optionally include an interconnect fabric coupled between the interface and the processor.

In Example 12, the subject matter of any of Examples 10 and 11 can optionally provide that the events comprise at least one of a hardware event or a software event that triggers an alarm signal being transmitted to the interconnect.

In Example 13, the subject matter of any of Examples 10 and 11 can optionally provide that the events include start events and end events.

In Example 14, the subject matter of Example 13 can optionally provide that the QoS measurement is one of (a) a time interval between a start event and an end event, or (b) a number of failed trials between a start event and an end event.

In Example 15, the subject matter of Example 14 can optionally provide that the tracker logic is to compare the QoS measurement to a constraint to determine if there is a constraint violation.

In Example 16, the subject matter of claim 15 can optionally provide that the tracker logic can further include a first multiplexer converting a start event into a start event signal, a second multiplexer converting an end event into an end event signal, a state machine receiving the start event signal and the end event signal to generate an in-counting signal from occurrence of the start event signal to occurrence of the end event signal, a second counter for storing an accumulated count of the QoS measurement, a register for storing the constraint, a third multiplexer to select an increment signal, and an AND logic to provide an increment to the internal counter based on the selected increment signal and the in-counting signal.

In Example 17, the subject matter of claim 16 can further provide that in response to receiving the end event signal after the start event signal, the tracker logic is to output a complete status in a first output of the tracker logic, in response to receiving an increment signal, the tracker logic is to output a new increment signal in a second output if the in-counting signal is enabled, and in response to a comparison between the accumulated count and the constraint indicating that the accumulated count is greater than or equals to the constraint, the tracker logic is to output a constraint violation status in a third output of the tracker logic.

In Example 18, the subject matter of claim 17 can optionally provide that the tracker logic further comprises a maximum value register for storing a maximum value ever stored in the counter.

Example 19 is a method that may include receiving, at a bus of a tracker logic, a plurality of events including one of start events or end events, in response to detection of a start event, initiating a state machine of the tracker logic to enable an in-counting signal to ON state, in response to receiving an increment signal from the bus, incrementing a counter of the tracker logic while the in-counting signal is still ON, comparing the value of the counter with a constraint, and if the value is greater than or equals to the constraint, outputting a constraint-violated status.

In Example 20, the subject matter of Example 19 can optionally include in response to receiving an end event, disabling in-counting signal, and outputting a complete status.

In Example 21, the subject matter of any of Examples 19 and 20 can optionally provide that the value of the counter is a QoS measurement, and wherein the QoS measurement is one of (a) a time interval between the start event and the end event, or (b) a number of failed trials between the start event and the end event.

Example 22 is at least one machine readable medium comprising a plurality of instructions that in response to being executed on a central processing unit (CPU), cause the CPU to carry out a method, the method including include receiving, at a bus of a tracker logic, a plurality of events including one of start events or end events, in response to detection of a start event, initiating a state machine of the tracker logic to enable an in-counting signal to ON state, in response to receiving an increment signal from the bus, incrementing a counter of the tracker logic while the in-counting signal is still ON, comparing the value of the counter with a constraint, and if the value is greater than or equals to the constraint, outputting a constraint-violated status.

In Example 23, the subject matter of Example 22 can optionally include in response to receiving an end event, disabling in-counting signal, and outputting a complete status.

In Example 24, the subject matter of any of Examples 22 and 23 can optionally provide that the value of the counter is a QoS measurement, and wherein the QoS measurement is one of (a) a time interval between the start event and the end event, or (b) a number of failed trials between the start event and the end event.

Example 25 is an apparatus that can include means for receiving a plurality of events including one of start events or end events, means for, in response to detection of a start event, initiating a state machine of the tracker logic to enable an in-counting signal to ON state, means for, in response to receiving an increment signal, incrementing a counter of the tracker logic while the in-counting signal is still ON, means for comparing the value of the counter with a constraint, and if the value is greater than or equals to the constraint, means for outputting a constraint-violated status.

In Example 26, the subject matter of Example 25 can optionally include means for, in response to receiving an end event, disabling in-counting signal, and means for outputting a complete status.

In Example 27, the subject matter of any of Examples 25 and 26 can optionally provide the value of the counter is a QoS measurement, and wherein the QoS measurement is one of (a) a time interval between the start event and the end event, or (b) a number of failed trials between the start event and the end event.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   a processor to generate a plurality of events;
   an interface circuit coupled to the processor, the interface circuit to select events from the plurality of events, wherein the selected events comprise a start event and an end event; and
   a tracker logic coupled to the interface circuit to perform a quality of service (QoS) measurement, wherein the tracker logic further comprises a state machine to
      receive a start event signal pertaining to the start event and an end event signal pertaining to the end event, and
      generate an output signal based on the start event signal and the end event signal to control the QoS measurement.

2. The processing device of claim 1, further comprising:
   an interconnect fabric coupled between the interface circuit and the processor.

3. The processing device of claim 2, wherein the plurality of events comprise at least one of a hardware event or a software event that triggers an alarm signal being transmitted to the interconnect fabric.

4. The processing device of claim 1, wherein the QoS measurement is one of a time interval between the start event and the end event, or a number of failed trials between the start event and the end event.

5. The processing device of claim 4, wherein the tracker logic is further to compare the QoS measurement to a constraint to determine if there is a constraint violation.

6. The processing device of claim 5, wherein the tracker logic further comprises:
   a first multiplexer to convert the start event into the start event signal;
   a second multiplexer to convert the end event into the end event signal;
   a counter for storing an accumulated count of the QoS measurement;
   a register for storing the constraint;
   a third multiplexer to select an increment signal; and
   an AND logic to provide an increment to internal counter based on the selected increment signal and the output signal.

7. The processing device of claim 6, wherein:
   in response to receiving the end event signal after the start event signal, the tracker logic is to output a complete status in a first output of the tracker logic;
   in response to receiving an increment signal, the tracker logic is to output a new increment signal in a second output if the output signal is enabled; and
   in response to a comparison between the accumulated count and the constraint indicating that the accumulated count is greater than or equals to the constraint, the tracker logic is to output a constraint violation status in a third output of the tracker logic.

8. The processing device of claim 7, wherein the tracker logic further comprises a maximum value register for storing a maximum value ever stored in the counter.

9. A system-in-a-chip (SoC), comprising:
   an interface circuit to select events from a plurality of events generated by a processor, wherein the selected events comprise a start event and an end event; and
   a tracker logic, coupled to the interface circuit, to perform a quality of service (QoS) measurement based on the selected events, wherein the tracker logic further comprises a state machine to
      receive a start event signal pertaining to the start event and an end event signal pertaining to the end event, and
      generate an output signal based on the start event signal and the end event signal to control the QoS measurement.

10. The SoC of claim 9, further comprising:
    an interconnect fabric coupled between the interface circuit and the processor.

11. The SoC of claim 10, wherein the plurality of events comprise at least one of a hardware event or a software event that triggers an alarm signal being transmitted to the interconnect.

12. The SoC of claim 9, wherein the QoS measurement is one of a time interval between the start event and the end event, or a number of failed trials between the start event and the end event.

13. The SoC of claim 12, wherein the tracker logic is to compare the QoS measurement to a constraint to determine if there is a constraint violation.

14. The SoC of claim 13, wherein the tracker logic further comprises:
- a first multiplexer to convert the start event into a start event signal;
- a second multiplexer to convert the end event into an end event signal;
- a counter for storing an accumulated count of the QoS measurement;
- a register for storing the constraint;
- a third multiplexer to select an increment signal; and
- an AND logic to provide an increment to an internal counter based on the selected increment signal and the output signal.

15. The SoC of claim 14, wherein:
- in response to receiving the end event signal after the start event signal, the tracker logic outputs a complete status in a first output of the tracker logic;
- in response to receiving an increment signal, the tracker logic is to output a new increment signal in a second output if the output signal is enabled; and
- in response to a comparison between the accumulated count and the constraint indicating that the accumulated count is greater than or equals to the constraint, the tracker logic outputs a constraint violation status in a third output of the tracker logic.

16. The SoC of claim 15, wherein the tracker logic further comprises a maximum value register for storing a maximum value ever stored in the counter.

17. A method comprising:
- performing a quality of service (QoS) measurement for a processing system comprising a processor that is to generate a plurality of events;
- receiving, by a tracker logic circuit executing a state machine, a start event signal associated with a start event and an end event signal associated with an end event, the start event and the end event being selected from the plurality of events, wherein the start event signal and the end event signal are input to the state machine; and
- generating an output signal based on the start event signal and the end event signal to control the QoS measurement.

18. The method of claim 17, further comprising:
- in response to receiving the start event signal, initiating the state machine to enable the output signal to an ON state;
- in response to receiving an increment signal, incrementing a counter associated with the tracker logic circuit while the output signal is in the ON state;
- in response to receiving the end event signal, disabling the output signal to an OFF state; and
- outputting the output signal.

19. The method of claim 18, wherein a value of the counter represents the QoS measurement, and wherein the QoS measurement is associated with a time interval between the start event and the end event.

* * * * *